United States Patent [19]

Thaler et al.

[11] Patent Number: 5,156,758
[45] Date of Patent: Oct. 20, 1992

[54] POLYMERIC AMIDES FOR MULTIFUNCTIONAL VI IMPROVERS

[75] Inventors: Warren A. Thaler, Flemington; Joseph Wegensommer, Westfield; Darrell W. Brownawell, Scotch Plains; Donald N. Schulz, Annandale; John B. Gardiner, Mountainside, all of N.J.

[73] Assignee: Exxon Research and Engineering Company, Florham Park, N.J.

[21] Appl. No.: 622,720

[22] Filed: Dec. 4, 1990

Related U.S. Application Data

[63] Continuation of Ser. No. 495,524, Mar. 19, 1990, abandoned.

[51] Int. Cl.$^5$ ............................................. C10M 149/14
[52] U.S. Cl. .......................... 252/51.5 A; 525/301; 525/374; 525/382; 525/386
[58] Field of Search ................. 252/51.5 A; 525/302, 525/374, 382, 386

[56] References Cited

U.S. PATENT DOCUMENTS

| | | | |
|---|---|---|---|
| 3,660,057 | 5/1972 | Ilnyckyj | 252/51.5 A |
| 4,120,803 | 10/1978 | Malec | 252/51.5 A |
| 4,517,104 | 5/1985 | Bloch et al. | 252/51.5 A |

*Primary Examiner*—Jacqueline Howard
*Attorney, Agent, or Firm*—R. E. Nanfeldt; M. J. Tully

[57] ABSTRACT

A terpolymer having the formula:

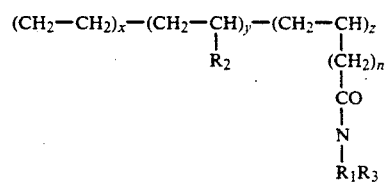

or

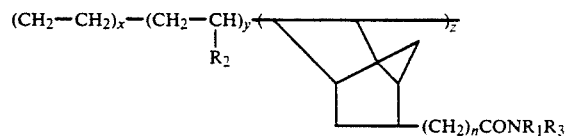

wherein n=0 to 12; x is about 15 to about 75 mole percent; y is about 25 to about 85 mole percent; z is about 0.1 to about 10 mole percent; $R_1$ and $R_3$ equal to H, $C_1$-$C_{10}$ alkyl, alkyl amino, alkylpolyamino, alkyl amino ether, alkyl amino alcohol groups and $R_2$ is an alkyl group having about 1 to about 8 carbon atoms.

14 Claims, No Drawings

POLYMERIC AMIDES FOR MULTIFUNCTIONAL VI IMPROVERS

This is a continuation of copending application Ser. No. 07/495,524, filed on Mar. 19, 1990, now abandoned.

FIELD OF THE INVENTION

The invention relates to polymeric viscosity-improving dispersant additives for petroleum oils, particularly lubricating oils. These additives comprise a terpolymer of ethylene with one or more $C_3$ to $C_{28}$ alpha olefins, preferably propylene, which have been co-reacted with an ethylenically unsaturated carboxylic ester using a Ziegler-Natta catalyst in a solvent and then further reacted with a polyamine to form am amide. The invention includes the use of the aforementioned terpolymers in oil compositions. The invention also relates to processes for preparing the aforementioned terpolymers and especially the use of aluminum alkyls or aluminum alkyl halides as a complexing agent to shield the carboxylic ester group during the Ziegler-Natta polymerization and a superior catalyst for amide formation.

BACKGROUND OF THE INVENTION

This invention relates to a multifunctional polymeric additive for hydrocarbon compositions, particularly for lubricating oils. The additive is a terpolymer of ethylene/propylene/carboxylic amide.

The instant invention provides polymers which are primarily known for their viscosity modification. Various polymers have been used as viscosity modifiers. Terpolymers of vinyl acetate, an alkyl fumarate and maleic anhydride are taught, for example, in U.S. Pat. No. 3,087,893 and include copolymers made up of from 2 to 15 mole percent of maleic anhydride, 25 to 50 mole percent of an alkyl ester of an alpha, betaunsaturated dicarboxylic acid, and from 40 to 70 mole percent of an alkylene ester of a $C_1$ to $C_6$ monocarboxylic acid. Techniques for forming the polymers are also well-known. For example, a terpolyer of an alkyl fumarate, vinyl acetate, and maleic anhydride can be prepared by the process disclosed in the aforementioned U.S. Pat. No. 3,087,893 or by the improved process described in U.S. Pat. No. 3,136,743.

U.S. Pat. No. 3,637,610 teaches a viscosity modifier which is an oil soluble polymer having free carboxylic acid groups which react with amine-containing polymers.

DESCRIPTION OF THE PRIOR ART

The concept of incorporating acid moieties into viscosity improving high molecular weight ethylene copolymers, followed by reaction with an amine to form a viscosity-improving dispersant oil additive is known in the art, as indicated by the following patents.

U S. Pat. No. 3,316,177 teaches ethylene copolymers, such as ethylene-propylene, or ethylene-propylene-diene, which are heated to elevated temperatures in the presence of oxygen so as to oxidize the polymer and cause its reaction with maleic anhydride, which is present during the oxidation. The resulting polymer can then be reacted with alkylene polyamines.

U. S. Pat. No. 3,326,804 teaches reacting ethylene copolymers with oxygen or ozone to form a hydroperoxidized polymer, which is grafted with maleic anhydride, followed by reaction with polyalkylene polyamines.

U.S. Pat. No. 4,089,794 teaches grafting the ethylene copolymer with maleic anhydride using peroxide in a lubricating oil solution wherein the grafting is preferably carried out under nitrogen, followed by reaction with polyamine.

U.S. Pat. No. 4,137,185 teaches reacting $C_1$ to $C_{30}$ mono-carboxylic acid anhydrides and dicarboxylic anhydrides, such as acetic anhydride, succinic anhydride, etc., with an ethylene copolymer reacted with maleic anhydride and a polyalkylene polyamine to inhibit cross-linking and viscosity increase due to further reaction of any primary amine groups which were initially reacted.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer is reacted with a polyamine.

U.S. Pat. No. 4,169,063 reacts an ethylene copolymer in the absence of oxygen with chlorine at temperatures of 150° C. to 250° C. with maleic anhydride, followed by reaction with polyamine.

A number of prior disclosures teach avoiding the use of polyamine having two primary amine groups to thereby reduce cross-linking problems which become more of a problem as the number of amine moieties added to the polymer molecule is increased in order to increase dispersancy.

German Published Application No. P3025274.5 teaches an ethylene copolymer reacted with maleic anhydride in oil using a long chain alkyl hetero or oxygen containing amine.

U.S. Pat. No. 4,132,661 grafts ethylene copolymer, using peroxide and/or air blowing with maleic anhydride and then reacts with a primary-tertiary diamine.

U.S. Pat. No. 4,160,739 teaches an ethylene copolymer which is grafted, using a free radical technique, with alternating maleic anhydride and a second polymerizable monomer, such as methacrylic acid, which materials are reacted with an amine having a single primary or a single secondary amine group.

U.S. Pat. No. 4,171,273 reacts an ethylene copolymer with maleic anhydride in the presence of a free radical initiator and then with mixtures of $C_4$ to $C_{12}$ n-alcohol and amine, such as N-aminopropylmorpholine or dimethylamino propylamine, to form a V.I.-dispersant-pour depressant additive.

U.S. Pat. No. 4,219,432 teaches maleic anhydride grafted ethylene copolymer reacted with a mixture of amine having only one primary group, together with a second amine having two or more primary groups.

German Published Application No. 2753569.9 shows an ethylene copolymer reacted with maleic anhydride by a free radical technique and then reacted with an amine having a single primary group.

German Published Application No. 2845288 grafts maleic anhydride on an ethylene-propylene copolymer by thermal grafting at high temperatures and then reacts with amine having one primary group.

French Published Application No. 2423530 teaches the thermal reaction of an ethylene copolymer with maleic anhydride at 150° C. to 210° C., followed by reaction with an amine having one primary or secondary group.

U S. Pat. No. 4,518,757 teaches heterogeneous catalyzed copolymers of alpha olefins and alpha olefin ester complexes for frictional drag reduction.

U.S. Pat. No. 3,492,277 teaches olefin copolymers containing functional groups wherein the polar monomer is reacted with an organoaluminum compound by heating between 60° to 150°? ? C? ? .

The early patents, such as U.S. Pat. Nos. 3,316,177 and 3,326,804, taught the general concept of grafting an ethylene-propylene copolymer with maleic anhydride and then reacting with a polyalkylene polyamines such as polyethylene amines. Subsequently, U.S. Pat. No. 4,089,794 was directed to using an oil solution for free radical peroxide, grafting the ethylene copolymer with maleic anhydride and then reacting with the polyamine. This concept had the advantage that by using oil the entire reaction could be carried out in an oil solution to form an oil concentrate, which is the commercial form in which such additives are sold. This was an advantage over using a volatile solvent for the reactions, which has to be subsequently removed and replaced by oil to form a concentrate. Subsequently, in operating at higher polyamine levels in order to further increase the dispersing effect, increased problems occurred with the unreacted amine groups cross-linking and, thereby, causing viscosity increase of the oil concentrate during storage and subsequent formation of haze and, in some instances, gelling. Even though one or more moles of the ethylene polyamine were used per mole of maleic anhydride during imide formation, cross-linking became more of a problem as the nitrogen content of the polymers was increased. One solution was to use the polyamines and then to react the remaining primary amino groups with an acid anhydride, preferably acetic anhydride, of 4,137,185 or the sulfonic acid of U.S. Pat. No. 4,144,181. The cross-linking could also be minimized by avoidance of the ethylene polyamines and instead using amines having one primary group which would react with the maleic anhydride, while the other amino groups would be tertiary groups which were substantially unreactive. Patents or published applications showing the use of such primary-tertiary amines, noted above, are U.S. Pat. No. 4,219,432, wherein a part of the polyamine was replaced with a primary-tertiary amine; U.S. Pat. No. 4,132,661; U.S. Pat. No. 4,160,739; U.S. Pat. No. 4,171,273; German No. P2753569.9; German No. 2,845,288; and French No. 2,433,530.

Still another problem which arose when using free radical initiators with mineral oil as the grafting medium is that, as the grafting levels were increased to increase the dispersancy level, a larger proportion of the oil molecules in turn became grafted with the maleic anhydride. Then, upon subsequent reaction with amine, these grafted oil article tended to become insoluble and to form a haze. To avoid using initiators, such as peroxides, for grafting and to avoid the use of oil, several of the above-noted patents utilized thermal grafting in solvent, preferably while using an ethylene copolymer containing a diene monomer so as to achieve an "ene" type reaction between the unsaturation resulting from the diene moiety and the maleic anhydride. However, generally such "ene" reactions are slower than peroxide grafting.

U.S. Pat. No. 4,517,104 represents a further improvement over the art in that it permits the utilization of the generally less expensive polyalkylene polyamines having two primary amine groups, while achieving good dispersancy levels, inhibiting crosslinking and allowing initiator, e.g.,, peroxide, grafting in oil.

The present invention represents a further improvement over the art in that it produces a carboxy-containing ethylene terpolymer in a single process step, whereas the prior art requires both a polymerization reaction and a separate graft on "ene" adduction or process. The present invention has the further advantage in that no deleterious byproducts are formed, such as acid functionalized solvent. Such acid functionalized solvent byproducts are a serious problem and are overcome in U.S. Pat. No. 4,517,104 only by the addition of a significant quantity of high molecular weight polyisobutylene succinic anhydride. The present invention has the further advantage in that the dispersant functional group, i.e., the amine, is attached to the polymer backbone via an amide linkage with much superior viscosity stability during storage compared to the imide linkage of the prior art.

SUMMARY OF THE INVENTION

The present invention relates to hydrocarbon solution additives which are terpolymers and have multifunctional properties including viscosity modification and sludge dispersing properties wherein the instant terpolymers are also viscosity control agents for nonpolar hydrocarbon liquids.

GENERAL DESCRIPTION OF THE INVENTION

The present invention relates to hydrocarbon solution additives which are terpolymers of ethylene/propylene/carboxylic amide and have multifunctional properties including viscosity modification and sludge dispersing properties, wherein the instant terpolymers are also viscosity control agents for nonpolar hydrocarbon liquids, such as jet fuel.

The terpolymers of the instant invention are terpolymers of ethylene/propylene/carboxylic amide. The terpolymers of the instant invention are formed by a Ziegler-Natta polymerization of the ethylene propylene and a carboxylic acid or ester to form a terpolymer of the ethylene, propylene and carboxylic acid or ester. This terpolymer is subsequently reacted with a polyamine or amino alcohol to form the terpolymer of the ethylene, propylene and a carboxylic amide.

A suitable hydrocarbon soluble, water insoluble terpolymer of the instant invention has the formula:

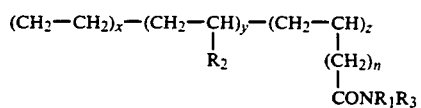

or

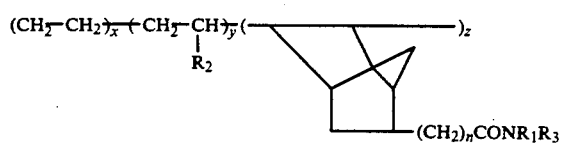

wherein x is about 15 to about 75 mole %, more preferably about 30 to about 67 mole %, and most preferably about 30 to about 63; y is about 25 to about 85 mole %, more preferably about 33 to about 70 mole %, and most preferably about 37 to about 70 mole %; and z is about 0.1 to about 10 mole %, more preferably about 0.2 to about 9, n=0 to 12; and $R_1$ and $R_3$ equal H, $C_1$-$C_{10}$ alkyl, alkylamino, alkyl polyamino, alkyl aminoether, alkylamino alcohol groups, and $R_2$ is an alkyl group having 1-8 carbon atoms.

A preferred monomer is propylene, however, alpha-olefins suitable in place of propylene to form the copolymer, or to be used in combination with ethylene and propylene to form a terpolymer, tetrapolymer, etc. include 1-butene,1-pentene, 1-hexane, 1-heptane, 1-octene, 1-nonene, 1-decene, etc.; also branched chain alpha-olefins, such as 4-methyl-1-pentene, 4-methyl-1-hexene, 5-methylpentene-1,4,4-dimethyl-1-pentene, and 6-methylheptene-1, etc. and mixtures thereof.

The polymers of this invention generally will have a number average molecular weight ($\overline{M}_n$) of from about 5,000 to about 500,000, preferably 10,000 to 200,000 and optimally from about 20,000 to 100,000. The multifunctional viscosity modifiers of this invention will generally have a narrow range of molecular weight, as determined by the ratio of weight average molecular weight ($\overline{M}_w$) to number average molecular weight ($\overline{M}_n$). Polymers having a ($\overline{M}_w/\overline{M}_n$) of less than 10, preferably less than 7, and more preferably 4 or less, are most desirable. As used herein, ($\overline{M}_n$) and ($\overline{M}_w$) are measured by the well known techniques of membrane osmometry and gel permeation chromatography.

The terpolymer of the ethylene/propylene/ carboxylic acid or ester is reacted with a polyamine, amine, aminoalcohol or amine ether in the presence of a catalyst at a temperature of about 100° C. to about 260° C. for a sufficient period of time to form the terpolymer of the ethylene/propylene/carboxylic amide.

Suitable polyamines include ethylene diamine, diethylene triamine, triethylene tetramine, tetraethylene pentamine, N,N-dimethyl ethylene diamine, N,N diethyl ethylene diamine, N,N dimethyl trimethylene diamine, N,N-diethyl trimethylene diamine, etc.

Amino alcohols and ethers are also suitable. Examples include 2-aminoethanol, diethanolamine triethanolamine, N-aminomethylmorpholine, N-aminoethylmorpholine, N-aminopropylmorpholine, tris hydroxymethyl amainomethane (THAM), Azadioxabicyloooctane (DOBO), aminomethyl pyridine, aminoethylpyridine, aminopropylpyridine, aminothiazoles, piperazines, aminopiperazines, hydroxy derivatives thereof and other amines with similar functional groups.

Suitable catalysts for the amidation process are tin metal salts, such as stannous octoate (2-ethylhexoate). Other catalysts suitable for the reaction of carboxylic acid polymer functionality with amines to produce amides include silica gel tetraalkyl or tetraaryl pyrophosphites, trialkyl or triaryl phosphites. The triaryl phosphites are preferred phosphite catalysts. Polyphosphoric acid and boric acid are also catalysts for the formation of the amide polymer derivative.

The concentration of the terpolymers of the instant invention in the hydrocarbon liquid is about 0.001 to about 25 weight percent, wherein the oil composition range from gasoline fractions through oils. The additives of this invention can also be employed, either alone or in combination, with other hydrocarbon-soluble additives in jet fuels and gasolines in concentrations ranging from about 0.001 to 1.0 weight percent as detergent and/or rust preventive additives.

In controlling the viscosity of non-polar hydrocarbon liquids the terpolymer of the instant invention is added to the non-polar hydrocarbon liquid at a concentration of about 0.001 to about 25 weight percent, more preferably about 0.05 to about 15, and most preferably about 0.7 to about 14.

DESCRIPTION OF THE PREFERRED EMBODIMENTS

The following Examples illustrate the present invention without, however, limiting the same hereto.

EXAMPLE 1

A reactor containing 3,000 ml of dry n-heptane was fed ethylene at 20 g/hour, propylene at 40 g/hour, methyl undecylenate (7.5 ml methyl undecylenate +6.75 ml diethyl aluminum chloride +19 ml n-hexane) at 22 ml/hour, VCl$_4$ (10 ml VCl$_4$+90 ml cyclohexane) at 12 ml/hour, and diethyl aluminum chloride (25% DEAC +75% n-hexane) at 25 ml/hour. The reaction temperature was 15° C.. The reaction time was 2 hours. The polymer was precipitated in 3.5 gallons of acetone and washed in acetone +10 ml concentrated HCl +90 ml H$_2$O and then washed again in acetone +2 g Irganox 1010. The yield of polymer was 80 g. The polymer purified by reprecipitation contained 19 mmoles ester/100 g polymer.

EXAMPLE 2

A reactor containing 3,000 ml dry n-heptane was fed ethylene at 20 g/hour, propylene at 40 g/hour, methyl undecylenate (10 ml ester complexed with 8.5 ml diethyl aluminum chloride +25.5 ml hexane) at 28 ml/hour for a total of 42 ml, VCl$_4$ (10 ml VCl$_4$+90 ml cyclohexane) at 12 ml/hour for a total of 21 ml and diethyl aluminum chloride (25% DEACl plus 75% n-hexane) at 36 ml/hour for a total of 63 ml. The reaction temperature was 10° C., the total reaction time was 3 hours. The polymer was precipitated in 3.5 gallons acetone plus 10 ml HCl and 90 ml H$_2$O. The yield of polymer was 108 g. The inherent viscosity in decalin at 135° C. was 0.97. The polymer purified by reprecipitation contained 15.7 mmoles ester/100 g polymer.

EXAMPLE 3

A reactor containing 3,000 ml dry-heptane was fed ethylene at 20 g/hour, propylene at 40 g/hour, phenyl undecylenate (ester complexed with ethyl aluminum sesquichloride) at 18 ml/hour, VC14 (10 ml VCl$_4$+90 ml cyclohexane) at 4 ml/hour, and ethyl aluminum sesquichloride (25% ET$_3$Al$_2$Cl$_3$ +75% hexane) 40 ml/hour. The reaction temperature was 10° C., the reaction time was 4 hours. The polymer was precipitated in 3.5 gallons of acetone containing 20 ml concentrated HCl plus 100 ml H$_2$O. The above procedure was repeated until the yield of polymer was 770 g. The inherent viscosity in decalin at 135° C. is 1.45. The polymer purified by reprecipitation contained 18.7 mmoles of ester/100 g of polymer.

EXAMPLE 4

A reactor containing 3,000 ml dry n-heptane was fed ethylene at 20 g/hour, propylene at 70 g/hour, thioethyl undecylenate (7.55 ml ester complexed with 4 ml of diethylaluminum chloride, 16.5 ml hexane) at 18 ml/hour, VCl$_4$ (10 ml VCl$_4$+90 ml cyclohexane) at 8 ml/hour and diethyl aluminum chloride (25% DEAC +75% n-hexane) at 40 ml/hour. The reaction temperature was 10° C.. The total reaction time was 3 hours. The polymer was precipitated in 3.5 gallons acetone plus 30 ml HCl plus 70 ml H$_2$O. The yield of polymer was 126 g. The inherent viscosity in decalin at 135° C. was 0.97. The polymer purified by reprecipitation contained 10 mmoles of ester/100 g polymer.

EXAMPLE 5

A reactor containing 3,000 ml dry n-heptane was fed ethylene at 20 g/hour, propylene at 40 g/hour, trimethyl silyl undecylenate (8.25 ml ester +4 ml diethyl aluminum chloride, 16.2 ml hexane) at 52 ml/hour, VCl$_4$ (10 ml VCl$_4$+90 ml cyclohexane) at 8 ml/hour and diethylaluminum chloride (25% DEACl +75% hexane) at 40 ml/hour. The polymerization temperature was 10° C., the polymerization time was 3 hours. After 3 hours of polymerization 44 g of NAPM (N-aminopropylmorpholine) was added. The temperature was raised to 85° C. for ½ hour. The polymer was precipitated in acetone-isopropanol plus 30 ml HCl once, followed by reprecipitation from acetone-isopropanol plus 2 g IRG 1010. The yield of polymer was 143 g. The inherent viscosity in decalin at 135° C. was 1.15. The nitrogen content of the polymer was 0.315%. Based on nitrogen the polymer contained 11.3 mmoles amide/100 grams polymer.

EXAMPLE 6

15 g of the polymer of Example 1 was dissolved in 85 g of S100N at lubricating oil 170° C. After the polymer dissolved, 0.5 g NAPM (N-aminopropylmorpholine) was added and the temperature maintained at 170° C. for 24 hours. Unreacted NAPM was removed with N$_2$ stripping. The weight percent nitrogen incorporated into the polymer was 0.091. On the basis of nitrogen the polymer contained 3.2 mmoles NAPM/100 grams of polymer.

EXAMPLE 7

Same as Example 6, except 0.1 g of stannous octoate was added with the NAPM. The weight percent nitrogen incorporated into the polymer was 0.282. On the basis of nitrogen the polymer contained 10.1 mmoles NAPM/100 g polymer.

EXAMPLE 8

5 g of the polymer of Example 2 was dissolved in 10 ml of tetrahydrofuran. 0.5 g NAPM was added to the above solution. The tetrahydrofuran was carefully removed by evaporation. The remaining contents of the test tube were heated to 240° C. for six hours in an oil bath under a nitrogen blanket. Unreacted NAPM was removed by nitrogen stripping. The weight percent nitrogen incorporated into the polymer was 0.123. On the basis of nitrogen the polymer contained 4.4 mmoles NAPM/100 g polymer.

EXAMPLE 9

Same as Example 8 except 0.1 g stannous octoate was added with the NAPM. The weight percent nitrogen incorporated into the polymer was 0.914. On the basis of nitrogen the polymer contained 6.9 mmoles NAPM/100 g polymer.

EXAMPLE 10

320 g of the terpolymer of Example 3 was added to 2880 grams of S-100N lubricating oil. The reaction was heated to 170° C. with nitrogen sparging for 5 hours to dissolve the polymer. 21.3 g of N-aminopropylmorpholine (NAPM) were added over 15 minutes after 3.2 grams of stannous octoate were added at 170° C. with a nitrogen blanket. The reaction was stirred and heated at 170° C. for 5 hours, heated again to 170° C. and 6 g of NAPM added. The mix was again heated for 2 hours. The mix was then heated to 180° C. for 3 hours while the excess NAPM was stripped off. The reaction was cooled and the material removed for analysis. The purified polymer contained 0.416 weight percent N. On the basis of nitrogen the polymer contained 14.9 mmoles NAPM/100 g polymer. On the basis of the amide IR peak at 1670 cm$^{-1}$ the polymer contained 16.2 mmoles NAPM/100 g polymer.

EXAMPLE 11

An oil solution containing 7.5% of the polymer of Example 4 was heated to 170° C. for 24 hours with stannous octoate catalyst and NAPM. The resulting polymer contained 11.2 mmoles NAPM/100 g polymer.

EXAMPLE 12

The ability of a catalyst such as stannous octoate to markedly improve the conversion of ester to amide is demonstrated in Table I. The data in Table I also demonstrated the superiority of phenyl ester compared to methyl ester in the conversion to amide.

TABLE I

| | CONVERSION OF ESTER TO AMIDE | | | | |
|---|---|---|---|---|---|
| | Ester | | | Amide | |
| Ester Polymer | Type | Content mmoles/ 100 g polymer | Cat. | Content mmoles/ 100 g Polymer | Amide Polymer |
| Ex. 1 | methyl | 19 | no | 3.2 | Ex. 6 |
| Ex. 1 | methyl | 19 | yes | 10.1 | Ex. 7 |
| Ex. 2 | methyl | 15.7 | no | 4.4 | Ex. 8 |
| Ex. 2 | methyl | 15.7 | yes | 6.9 | Ex. 9 |
| Ex. 3 | phenyl | 18.7 | yes | 14.9 | Ex. 10 |

EXAMPLE 13

The outstanding stability of the amide polymer of Example 10 in terms of viscosity growth during heated storage compared to a typical succinimide multifunctional viscosity modifier (Comparison A) is demonstrated in Table II.

TABLE II

| | Viscosity, Cts @ 100° C. Change, 82° C. Storage | | | |
|---|---|---|---|---|
| | Viscosity Initial | Viscosity 2 Weeks | Viscosity 4 Weeks | Viscosity 8 Weeks |
| Example 10 | 891 | 888 | 877 | 841 |
| Comparison A | 1380 | 1815 | 2136 | 2757 |

The polymer of Comparison A is a maleic anhydride peroxide graft of an ethylene-propylene copolymer reacted with the same amine as Example 4 and is further described in copending application, U.S. application Ser. No. 748,031.

EXAMPLE 14

Multifunctional viscosity modifiers where the amine functionality is bound via succinimide leakage are known to interact with polar additives normally found in lubricants. This interaction, which leads to and is indicated by an increase in viscosity, is disadvantageous. The amide polymers of this invention have a markedly reduced interaction with polar lubricant additives, as shown by the data in Table III.

TABLE III

Viscosity, Cts @ 100° C., Change 60° S Storage

| | Viscosity After 1 Hour | Viscosity After 24 Hours |
|---|---|---|
| Polymer of Example 10[1] | 14.4 | 14.5 |
| Polymer, Comparison A[1,2] | 15.1 | 15.8 |

[1] Oil blend. 14.6 wt. % polymer (Example 10 or Comparison A). 77.7 wt. % S140N mineral oil. 7.5 wt. % detergent inhibitor, plus zinc dialkyl dithiophosphate and 0.2 wt. % pour depressant.
[2] Comparison A polymer is same for polymer used in Table II.

EXAMPLE 15

The ability of the polymer of Example 10 to disperse sludge and control varnish is demonstrated in Table IV.

TABLE IV

SLUDGE (SIB) & VARNISH (VIB) INHIBITOR BENCH TEST

| POLYMER | SIB RESULT | VIB RESULT |
|---|---|---|
| Example 10 | 6.0 | 2 |
| Comparison A[1] | 11.2 | 1 |
| Paratone 715[2] | 15.0 | 3 |
| None | 14.5 | 11 |

[1] Comparison A is the same nitrogen containing polymer used in Table II.
[2] Paratone 715 is a non-nitrogen viscosity modifier commercially available from Exxon Chemical Co.

Sludge Inhibition Bench (SIB) Test

The efficacy of the derivatized copolymers of this invention as dispersants in lubricating oil is illustrated in a Sludge Inhibition Bench (SIB) Test. The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C., that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkylthiophosphate anti-wear additive. The oil contained no sludge dispersant. A quantity of such used oil was acquired by draining and refilling the taxicab crankcase at 1,000–2,000 mile intervals.

The Sludge Inhibition Bench Test is conducted in the following manner: The aforesaid crankcase oil, which is milky brown in color, is freed of sludge by centrifuging for one hour at about 39,000 gravities (gs.). The resulting clear, bright red supernatant oil is then decanted from the insoluble sludge particles, thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil a small amount, such as 1 or 2 weight percent, on an active ingredient basis, of the particular additive being tested. Ten grams of each blend being tested are placed in a stainless steel centrifuge tube and are heated at 138/° C. for 16 hours in the presence of air. Following the heating the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as percent of sludge dispersed by comparison with a blank not containing any additional additive. The less new sludge precipitated in the presence of the additive the larger the value of percent sludge that is dispersed, and the more effective is the additive as a sludge dispersant. In other words, if the additive is effective, it will hold at least a portion of the new sludge that forms on heating and oxidation stably suspended in the oil so it does not precipitate down during the centrifuging.

Varnish Inhibition Test

Each test sample consisted of 10 grams of lubricating oil and either 1 or 2 weight percent of the neutralized polymer. The test oil to which the additive is admixed was a commercial lubricating oil obtained from a taxi af after about 2,000 miles of driving with said lubricating oil. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase gas which was a mixture of about 0.7 volume percent $SO_2$, 1.4 volume percent NO and balance air was bubbled through the test samples. At the end of the test period, which testing cycle can be any additive, the wall surfaces of the test flasks in which the samples were contained are visually evaluated as to the varnish inhibition. The amount of varnish imposed on the walls was rated 1 to 11, with the higher number being the greater amount of varnish.

What is claimed is:

1. A process for preparing copolymers containing ethylene and a carboxylic acid amide comprising:
   a. interpolymerizing a monomer mixture comprising ethylene, a $C_3$ to $C_{10}$ alpha olefin and an unsaturated $C_4$ to $C_{21}$ carboxylic acid or complexed with an aluminum alkyl or an aluminum alkyl halide in the presence of organic solvent and a Ziegler-Natta transition metal catalyst to form a copolymer having number average molecular weight of at least about 5,000;
   b. reacting the polymer of step (a) with an amine selected from the group consisting of an alkylamine, alkylpolyamine, alkyl amino ether and alkyl amino alcohol to form a copolyamide; and
   c. recovering said copolyamide.

2. The process of claim 1 wherein said $C_3$ to $C_{10}$ alpha olefin is propylene.

3. The process of claim 1 wherein said $C_4$ to $C_{21}$ monomer is an ester selected from the group consisting of methyl, phenyl, thioethyl and trimethyl silyl undecylenates.

4. The process of claim 1 wherein said acid or ester is complexed with diethyl aluminum chloride.

5. The process of claim 1 wherein said Ziegler-Natta transition catalyst comprises a mixture of $VCl_4$ and an alkyl aluminum halide.

6. The process of claim 1 wherein said copolymer contains from about 15 to about 75 mole % of ethylene, from about 25 to about 85 mole % of said $C_3$ to $C_{10}$ alpha olefin and from about 0.1 to about 10 mole % of said amide of said $C_4$ to $C_{21}$ carboxylic acid or ester.

7. The process of claim 6 wherein said copolymer has a number average molecular weight of from about 20,000 to about 100,000.

8. The process of claim 6 wherein said copolymer has a molecular weight distribution $M_w/M_n$ of less than 10.

9. The process of claim 8 wherein said copolymer has a molecular weight distribution $M_w/M_n$ of less than 4.

10. The process of claim 1 wherein said amidation reaction is conducted in the presence of an amidation catalyst.

11. The process of claim 10 wherein said amidation catalyst is stannous octoate.

12. The process of claim 1 wherein said amine is N-aminopropyl morpholine.

13. A copolymer prepared by the process of claim 1.

14. A polymeric solution comprising:
 a. a non-polar lubricating oil; and
 b. about 0.1 to about 30 weight percent of he copolymer of claim 13.